United States Patent
Yu et al.

(10) Patent No.: US 7,347,290 B2
(45) Date of Patent: Mar. 25, 2008

(54) MULTI-PART ENERGIZER FOR MECHANICAL SEAL ASSEMBLY

(75) Inventors: Jiaqing Yu, Houston, TX (US); Zhou Yong, Spring, TX (US)

(73) Assignee: Smith International, Inc., Houston, TX (US)

( * ) Notice: Subject to any disclaimer, the term of this patent is extended or adjusted under 35 U.S.C. 154(b) by 381 days.

(21) Appl. No.: 10/868,527

(22) Filed: Jun. 15, 2004

(65) Prior Publication Data

US 2005/0274550 A1  Dec. 15, 2005

(51) Int. Cl.
*E21B 10/25* (2006.01)
*F16C 33/76* (2006.01)

(52) U.S. Cl. .................. 175/372; 277/336; 384/94
(58) Field of Classification Search .............. 175/372, 175/371; 277/336, 392, 399, 404, 406, 650, 277/654; 384/92, 94, 477
See application file for complete search history.

(56) References Cited

U.S. PATENT DOCUMENTS

| | | | |
|---|---|---|---|
| 3,761,145 A | 9/1973 | Schumacher, Jr. | 308/8.2 |
| 3,905,607 A * | 9/1975 | Maguire et al. | 277/382 |
| 3,980,309 A * | 9/1976 | Dechavanne | 277/550 |
| 3,985,366 A * | 10/1976 | Plouzek | 277/382 |
| 3,990,525 A | 11/1976 | Penny | 175/337 |
| 4,172,502 A | 10/1979 | Van Nederveen | 175/369 |
| 4,176,848 A | 12/1979 | Lafuze | |
| 4,179,003 A | 12/1979 | Cooper et al. | 175/371 |
| 4,194,795 A | 3/1980 | Rife | |
| 4,199,156 A | 4/1980 | Oldham et al. | 277/92 |
| 4,200,343 A | 4/1980 | Highsmith | |
| 4,248,484 A | 2/1981 | Newcomb | 308/8.2 |
| 4,249,622 A | 2/1981 | Dysart | 175/277 |
| 4,252,330 A | 2/1981 | Crow | 277/92 |
| 4,256,351 A | 3/1981 | Langford, Jr. | 308/8.2 |
| 4,359,111 A | 11/1982 | Gonzalez | 175/227 |
| 4,367,904 A | 1/1983 | Olschewski et al. | 384/95 |
| 4,394,020 A | 7/1983 | Oelke | 277/1 |
| 4,428,588 A | 1/1984 | Oelke | 277/83 |

(Continued)

FOREIGN PATENT DOCUMENTS

DE  1750609  4/1971

(Continued)

OTHER PUBLICATIONS

Great Britain Search Report for Application No. 0511996.1, dated Oct. 11, 2005 (3 p.).

(Continued)

*Primary Examiner*—Kenneth Thompson
(74) *Attorney, Agent, or Firm*—Conley Rose, P.C.

(57) ABSTRACT

An energizer for a mechanical seal assembly for use in a drill bit is disclosed. The energizer is a composite of at least two resilient materials, one having a durometer hardness that is greater than the other. The material contacting a journal provides relatively high frictional forces so as to prevent the energizer from rotating in relation to adjacent components. The relatively softer resilient material provides the energizing force necessary to maintain a good dynamic seal between the metal seal rings. The energizer components may be separate components that engage one another upon assembly, or may be bonded together to form a ring prior to assembly into the drill bit.

47 Claims, 6 Drawing Sheets

U.S. PATENT DOCUMENTS

| | | | |
|---|---|---|---|
| 4,428,686 A | 1/1984 | Brax | |
| 4,429,854 A | 2/1984 | Kar et al. | 384/94 |
| 4,466,621 A | 8/1984 | Garner et al. | 277/84 |
| 4,466,622 A | 8/1984 | Deane et al. | 277/92 |
| 4,515,400 A | 5/1985 | Smith et al. | 285/141 |
| 4,516,641 A | 5/1985 | Burr | 175/228 |
| 4,523,765 A | 6/1985 | Heidemann | |
| 4,613,005 A | 9/1986 | Olsson | 175/371 |
| 4,666,001 A | 5/1987 | Burr | 175/371 |
| 4,671,368 A | 6/1987 | Burr | 175/371 |
| 4,747,604 A | 5/1988 | Nakamura | 277/83 |
| 4,753,303 A | 6/1988 | Burr | 175/367 |
| 4,753,304 A | 6/1988 | Kelly, Jr. | 175/371 |
| 4,762,189 A | 8/1988 | Tatum | 175/371 |
| 4,813,502 A | 3/1989 | Dysart | 175/337 |
| 4,838,365 A | 6/1989 | Kotch | 175/371 |
| 4,903,786 A | 2/1990 | Welsh | 175/367 |
| 4,923,020 A | 5/1990 | Kelly, Jr. et al. | 175/372 |
| 5,005,989 A | 4/1991 | Karlsson | 384/94 |
| 5,009,519 A | 4/1991 | Tatum | 384/94 |
| 5,027,911 A | 7/1991 | Dysart | 175/57 |
| 5,040,624 A | 8/1991 | Schumacher et al. | 175/371 |
| 5,080,183 A | 1/1992 | Schumacher et al. | 175/371 |
| 5,295,549 A | 3/1994 | Dolezal et al. | 175/371 |
| 5,360,076 A | 11/1994 | Kelly, Jr. et al. | 175/371 |
| 5,362,073 A | 11/1994 | Upton et al. | 277/92 |
| 5,472,058 A * | 12/1995 | Hooper et al. | 175/371 |
| 5,740,871 A | 4/1998 | Williams | 175/371 |
| 5,842,700 A | 12/1998 | Fang et al. | 277/336 |
| 5,842,701 A | 12/1998 | Cawthorne et al. | 277/336 |
| 5,875,861 A | 3/1999 | Daly et al. | 175/37.1 |
| RE36,452 E | 12/1999 | Upton et al. | 277/336 |
| 6,026,917 A | 2/2000 | Zahradnik et al. | 175/371 |
| 6,033,117 A | 3/2000 | Cariveau et al. | 384/94 |
| 6,068,070 A | 5/2000 | Scott | 175/428 |
| 6,109,376 A | 8/2000 | Pearce | 175/371 |
| 6,123,337 A | 9/2000 | Fang et al. | 277/336 |
| 6,142,249 A * | 11/2000 | Zahradnik et al. | 175/371 |
| 6,170,830 B1 | 1/2001 | Cawthorne et al. | 277/336 |
| 6,173,969 B1 | 1/2001 | Stoll et al. | |
| 6,176,330 B1 | 1/2001 | Burr | 175/371 |
| 6,179,296 B1 | 1/2001 | Cawthorne et al. | 277/336 |
| 6,196,339 B1 | 3/2001 | Portwood et al. | 175/371 |
| 6,247,545 B1 | 6/2001 | Burr et al. | 175/371 |
| 6,254,275 B1 | 7/2001 | Slaughter, Jr. et al. | 384/92 |
| 6,305,483 B1 * | 10/2001 | Portwood | 175/371 |
| 6,427,790 B1 | 8/2002 | Burr | 175/371 |
| 6,450,271 B1 | 9/2002 | Tibbitts et al. | 175/374 |
| 6,536,542 B1 | 3/2003 | Fang et al. | 175/371 |
| 6,598,690 B2 | 7/2003 | Peterson | 175/371 |
| 6,684,966 B2 * | 2/2004 | Lin et al. | 175/372 |
| 6,769,491 B2 | 8/2004 | Zimmerman et al. | 166/387 |
| 2002/0108788 A1 | 8/2002 | Peterson et al. | |

FOREIGN PATENT DOCUMENTS

| | | |
|---|---|---|
| DE | 3521525 | 11/1986 |
| GB | 1530729 | 11/1978 |
| GB | 2098284 | 11/1982 |
| RU | 2107800 | 3/1998 |

OTHER PUBLICATIONS

Hooper et al., *The Design of a Mechanical Face Seal for a Roller Cone Drill Bit*, The American Society of Mechanical Engineers, Dec. 1991 (11 p.).

* cited by examiner

MULTI-PART ENERGIZER FOR MECHANICAL SEAL ASSEMBLY

CROSS-REFERENCE TO RELATED APPLICATIONS

Not Applicable.

STATEMENT REGARDING FEDERALLY SPONSORED RESEARCH OR DEVELOPMENT

Not Applicable.

BACKGROUND OF THE INVENTION

1. Field of the Invention

The invention relates generally to seal assemblies for sealing between a rotating and a static member. In one aspect, and more particularly, the invention relates to seals for rolling cone bits used to drill a borehole for the ultimate recovery of oil, gas or minerals. Still more particularly, the invention relates to energizers for mechanical face, metal-to-metal seals that are employed to seal and protect the bearing surfaces between the rolling cone cutters and the journal shafts on which they rotate.

2. Description of the Related Art

An earth-boring drill bit is typically mounted on the lower end of a drill string. With weight applied to the drill string, the drill string is rotated such that the bit engages the earthen formation and proceeds to form a borehole along a predetermined path toward a target zone.

A typical earth-boring bit includes one or more rotatable cone cutters. The cone cutters roll and slide upon the bottom of the borehole as the drillstring and bit are rotated, the cone cutters thereby engaging and disintegrating the formation material in their path. The rotatable cone cutters may be described as generally conical in shape and are therefore referred to as rolling cones.

Rolling cone bits typically include a bit body with a plurality of journal segment legs. The rolling cones are mounted on bearing pin shafts (also called journal shafts or pins) that extend downwardly and inwardly from the journal segment legs. As the bit is rotated, each cone cutter is caused to rotate on its respective journal shaft as the cone contacts the bottom of the borehole. The borehole is formed as the action of the cone cutters removes chips of formation material ("cuttings" or "drilled solids"), which are carried upward and out of the borehole by the flow of drilling fluid that is pumped downwardly through the drill pipe and out of the bit. Liquid drilling fluid is normally used for oil and gas well drilling, whereas compressed air is generally used as the drilling fluid in mining operations.

Seals are provided in glands formed between the rolling cones and their journal shafts to prevent lubricant from escaping from around the bearing surfaces and to prevent the cutting-laden, abrasive drilling fluid from entering between the cone and the shaft and damaging the bearing surfaces. When cuttings are conveyed into the seal gland, they tend to adhere to the gland and/or seal component surfaces, and may cause deformation, damage and/or slippage of the seal components. Moreover, the cuttings can accelerate abrasive wear of all seal components and of the bearing surfaces.

In oil and gas drilling, the cost of drilling a borehole is proportional to the length of time it takes to drill to the desired depth and location. The time required to drill the well, in turn, is greatly affected by the number of times the drill bit must be changed before reaching the targeted formation. This is the case because each time the drill bit wears out or fails as a bore hole is being drilled, the entire string of drill pipes, which may be miles long, must be retrieved from the borehole, section by section in order to replace the bit. Once the drill string has been retrieved and the new bit installed, the bit must be lowered to the bottom of the borehole on the drill string, which again must be constructed section by section. The amount of time required to make a round trip for replacing a bit is essentially lost from drilling operations. As is thus obvious, this process, known as a "trip" of the drill string, requires considerable time, effort and expense. It is therefore advantageous to maximize the service life of a drill bit. Accordingly, it is always desirable to employ drill bits that will be durable enough to drill for a substantial period of time with acceptable rate of penetration (ROP).

The durability of a bit and the length of time that a drill bit may be employed before it must be changed depend upon numerous factors. Importantly, the seals must function for substantial periods under extremely harsh downhole conditions. The type and effectiveness of the seals greatly impact bit life and thus, are critical to the success of a particular bit design.

One cause of bit failure arises from the severe wear or damage that may occur to the bearings on which the cone cutters are mounted. These bearings can be friction bearings (also referred to as journal bearings) or roller type bearings, and are typically subjected to high drilling loads, high hydrostatic pressures, and high temperatures.

As previously mentioned, the bearing surfaces in typical bits are lubricated, with the lubricant being retained within the bit by use of seals. Certain metal-to-metal seals (sometimes also referred to as mechanical seals or mechanical face seals) have been employed in rolling cone bits. Metal-to-metal seals were developed in order to increase the working life of the bearings, given that the failure of older elastomeric o-ring seals was one of the most frequent causes of bit failure when drilling at deeper depths. However, with metal-to-metal seals, great care and attention must be employed in their design, manufacture and assembly to ensure that, in use, the engaging sealing surfaces remain undamaged and in close contact with one another so as to ensure a good seal.

The mechanical seal typically includes a rigid metal seal ring having a dynamic seal surface, one that is placed into rotating contact against a non-rotating seal surface such as a surface of an adjacent hard metal ring. The seal ring also includes a static seal surface that engages a surface that is stationary with respect to the seal ring. Typically, a resilient energizing ring is disposed against the static seal surface of the seal ring in order to bias the dynamic seal surface of the metal seal ring into firm contact with the adjacent dynamic sealing surface. In such assemblies, the energizing ring or "energizer" does not itself provide the dynamic seal, but instead provides only a static seal, and serves to bias together other components that provide the dynamic seal. Although the bit will experience severe and changing loading, as well as a wide range of different temperature and pressure conditions, the dynamic and static seal surfaces must nevertheless remain sealingly engaged throughout the life of the bit's cutting structure in order to prevent the lubricant from escaping and/or cuttings from entering the lubricated areas.

One of the failure modes for mechanical seals is undesirable energizer rotation. That is, in many designs, it is desirable that the energizer remain stationary with respect to the adjacent seal components that it engages. Unfortunately, once an energizer begins to rotate, it wears away quickly, resulting in loss of lubricant from the bearing surfaces or the ingress of abrasive drilling fluid and/or drilled cuttings into the bearing region since a pressure difference exists on two sides of the energizer. As a result of either or both of these conditions, the mechanical seals will prematurely fail, leading ultimately to bit failure and the need to "trip" the drill string in order to replace the failed bit. Accordingly, protecting the integrity of the seal is of utmost importance.

One known technique intended to prevent the energizer from undesired rotation is to roughen the contact surfaces of the bearing shaft and the seal ring that are engaged by the energizer. This may be done by blasting the region or by special machining. However, each of these techniques is time consuming and thus adds additional cost and time to manufacturing the drill bit. Further, roughening the contact surfaces is not entirely reliable, and in certain instances, it cannot provide sufficient friction to prevent the energizer from rotating. Further still, once some energizer rotation has occurred, the roughened surface abrades the engaged energizer surface, and thereby accelerates the wear and deterioration of the energizer. Thus, the proposed solution to seal failure caused by undesirable energizer rotation may, in certain instances, actually exacerbates the problem and leads to energizer deterioration and seal failure earlier than would otherwise occur.

It is therefore desirable that a new energizer be devised, one providing substantial biasing force to maintain good sealing contact between opposing metal seal rings, and also providing sufficient contact pressure and friction to prevent the energizer from rotating. Preferably, the energizer could be employed anywhere in a seal assembly where the energizer is to remain static with respect to an adjacent, engaged surface. Further still, it would be preferable if the manufacturing and assembly of the seal components were relatively quick and simple to accomplish.

Accordingly, to provide a drill bit with better performance and longer life, and thus to lower the drilling costs incurred in the recovery of oil and other valuable resources, it would be desirable to provide a seal assembly having the potential to provide longer seal life than conventional metal-to-metal seals. Preferably, such seal assemblies would provide a bit that will drill with acceptable ROP for longer periods so as to increase bit life and increase in footage drilled as compared to bits employing conventional seals.

SUMMARY OF EXEMPLARY PREFERRED EMBODIMENTS

Described herein is a seal assembly with mechanical seals for dynamically sealing between rotatable members, such as between a rolling cone cutter and a journal shaft of a rock bit. According to at least one embodiment of the invention, a seal assembly for sealing between spaced-apart and opposing surfaces comprises a first resilient ring of a first material, a second resilient ring of a second material that is different from the first material, where the first and second resilient rings engage one another to form a static seal and form an energizer that is disposed between the spaced-apart and opposing surfaces.

In accordance with another embodiment described herein, a seal assembly for a drill bit includes a bit body having a sealing surface, a substantially rigid ring spaced apart from the bit body and having a static sealing surface facing the sealing surface of the bit body, and a composite energizer disposed between the sealing surface of the bit body and the static sealing surface of the substantially rigid ring, where the energizer comprises first and second materials that differ in durometer hardness and geometric shape. The composite energizer may be formed by separate resilient rings that engage one another upon assembly of the seal assembly, or may comprise annular members that are bonded to one another. In certain embodiments, the material engaging the sealing surface of the bit body has a durometer hardness that is greater than the hardness of other materials of the energizer. The relatively wider contact region engaging the sealing surface of the bit body provides a substantial footprint and high frictional force so as to prevent relative rotation of the energizer.

In accordance with another embodiment herein, a drill bit includes a bit body with an extending journal shaft and a static sealing surface, a first substantially rigid seal ring and a second substantially rigid seal ring having engaging sealing surfaces and forming a dynamic seal therebetween, and an energizer biasing the first substantially rigid seal ring into sealing engagement with the second substantially rigid seal ring, where the energizer is static with respect to the first seal ring and sealing surface of the bit body. The energizer of this embodiment includes first and second annular members comprising differing materials. Preferably, the materials differ in durometer hardness. For example, the first material may have a durometer hardness within the range of 60-110 A while the second material has a durometer hardness within the range of 55-95A. The first and second resilient annular members may be separate rings, or they may be bonded together. The energizer may include more than two materials having differing durometer hardnesses. One material, for example a relatively hard material, may be completely enveloped by a relatively softer material.

In certain preferred embodiments, the surface of the first resilient annular member may be shaped to conform to the cross-sectional shape of the second resilient annular member. Similarly, in cross-section, the sides of the first resilient annular member may be curved or otherwise non-planar.

The use of materials having differing hardnesses, and optimizing the shape and hardness of the various components of the energizer offer the ability to enhance frictional forces to ensure that the energizer does not rotate, but instead remains static with respect to the drill bit body and the substantially rigid seal ring so as to enhance life of the energizer and enhance the effectiveness of the seal. Collectively, these features may offer the ability to increase the life of the seal and thus enhance bit life, thereby advancing the state of the art.

Embodiments described herein thus comprise a combination of features and advantages directed to overcome some of the deficiencies or shortcomings of prior art seal assemblies and drill bits. The various characteristics mentioned above, as well as other features and characteristics described in more detail below, will be readily apparent to those skilled in the art upon reading the following detailed description of preferred embodiments, and by referring to the accompanying drawings.

BRIEF DESCRIPTION OF THE DRAWINGS

For a more detailed description of the preferred embodiments of the present invention, reference will now be made to the accompanying drawings, wherein.

DETAILED DESCRIPTION OF EXEMPLARY PREFERRED EMBODIMENTS

Figure 1:
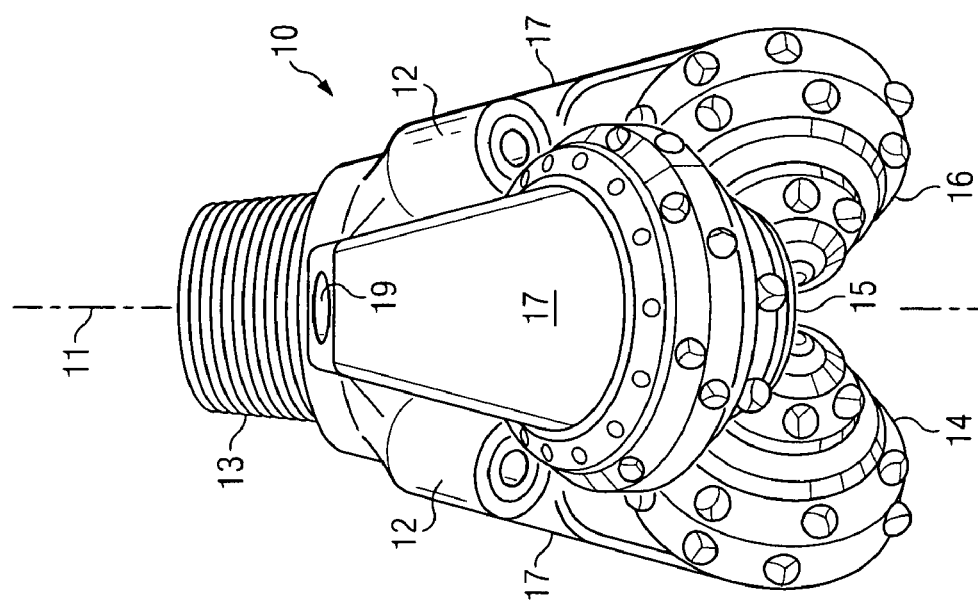
FIG. 1 is a perspective view of an earth boring bit incorporating the seal assembly described herein.

Referring first to FIG. 1, an earth-boring bit 10 includes a central axis 11 and a bit body 12. Body 12 includes a threaded portion 13 on its upper end for securing the bit to the drillstring (not shown). Bit body 12 is composed of three sections or legs 17 that are joined together to form bit body 12. Rotatably mounted to body 12 are three rolling cone cutters, 14, 15, 16. Each cone cutter 14-16 is rotatably mounted on a journal pin 18 (FIG. 2) that is oriented generally downward and inward toward the center of bit 10. Each journal pin 18 and each cone cutter 14-16 is substantially the same, such that the description of one such journal pin 18 and one cone cutter 14 will adequately describe the others.

It is to be understood that seal assemblies are described herein with respect to a three cone bit for purposes of example only, and that the seal assemblies described herein may be employed in single cone bits, as well as in bits having two or more cones. Likewise, the seals described herein may have application beyond drill bits, and may be used wherever a shaft seal is required to seal between a rotatable member mounted on the shaft and a member that is stationary relative to the rotatable member.

Figure 2:
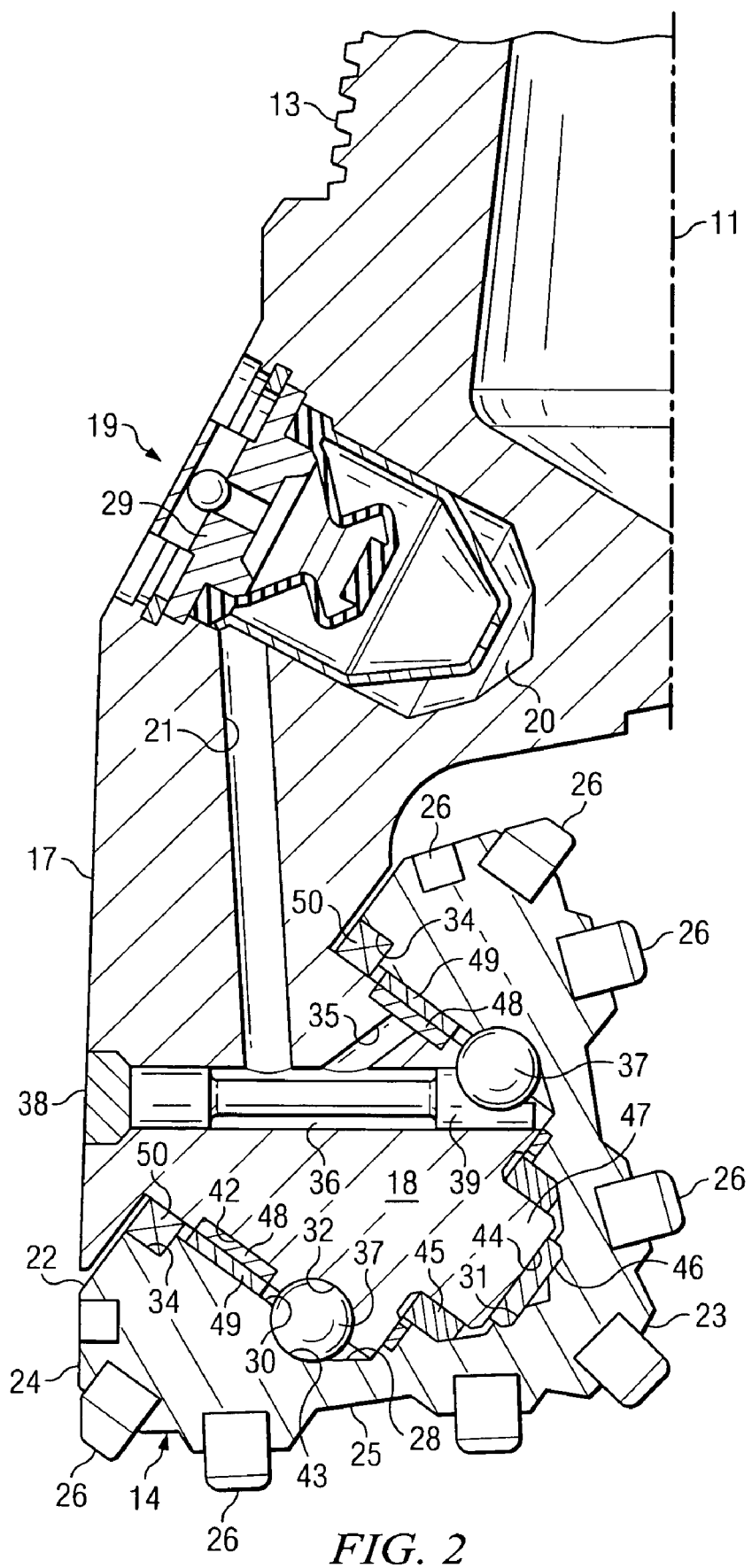
FIG. 2 is a partial section view taken through one leg and one rolling cone cutter of the bit shown in FIG. 1 and showing the seal assembly sealing between the rolling cone cutter and the leg of the bit body.

As best shown in FIG. 2, cone cutter 14 further includes a backface 22 and a nose portion 23 opposite backface 22. Cone 14 includes a frustoconical heel surface 24 and a generally conical surface 25 extending between heel surface 24 and nose 23. Secured within heel surface 24 and conical surface 25 are protruding cutter elements which, as depicted in FIGS. 1 and 2, comprise inserts 26, such as inserts made of tungsten carbide. Although not shown, the seals described herein may likewise be employed advantageously in "steel tooth" bits, also sometimes referred to as "milled tooth" bits, where the cutter elements are formed from the cone material, such as by a milling process, and coated with a hard-facing material.

Referring still to FIG. 2, cone cutter 14 includes a central cavity or bore 28, which receives the journal pin 18. Central bore 28 includes a bearing surface 30 and end surface 31. Formed in bearing surface 30 is a circumferential groove 43 for receiving a plurality of locking balls 37. Bearing surface 30 further includes a seal assembly recess 34 formed adjacent to back face 22.

Journal pin 18 includes a bearing surface 42 that is substantially concentric to bearing surface 30 in cone 14. Bearing surface 42 includes a groove 32 for receiving locking balls 37. A ball passageway 36 intersects groove 32 and forms a means by which locking balls 37 are placed into cone 14 during assembly. The locking balls retain cone 14 on the journal pin 18. After the balls 37 are in place, ball retainer 39 is inserted through ball passageway 36 and an end plug 38 is welded or otherwise secured to close off the ball passageway 36.

Journal pin 18 further includes a reduced diameter portion 47 and end-surface 44. Bearing surface 42 of pin 18 and bearing surface 30 of cone 14 may include cylindrical inlays 48, 49, respectively, that are disposed in grooves formed in the respective parts for reducing friction, such inlays being made, for example, of aluminum bronze alloys. A nose bushing 45 is disposed about reduced diameter portion 47 of pin 18. Cone 14 is disposed over the pin 18 with nose button 46 positioned between end-surface 44 and the end portion 31 of central bore 28.

Seal assembly 50, shown schematically in FIG. 2 and described in more detail below, is disposed about journal pin 18 so as to seal between cone cutter 14 and pin 18.

The bearing structure described and shown FIG. 2 is generally known as a journal bearing. Other types of bits, particularly in bits having larger diameters and bits designed for higher rotational speeds, may include roller bearings disposed between the journal pin and the cone steel. It is to be understood that the seal assemblies described herein can be used with all types of rotary cone bits, including journal bearing and roller bearing bits, and in both rock bits and mining bits.

The bearing surfaces 30, 42 between the cone 14 and journal pin 18 are lubricated by grease. The grease is applied so as to fill the regions adjacent to the bearing surfaces and to fill various interconnected passageways such that, upon bit assembly, air is essentially excluded from the interior of the bit. The bit includes a grease reservoir 19, including a pressure compensation subassembly 29 and a lubricant cavity 20, which is connected to the ball passageway 36 by lubricant passageway 21. The grease is retained in the bearing structure and the various passageways, including diagonal passageway 35 and passageways 21, 36, by means of seal assembly 50. Likewise, seal assembly 50 prevents drilled cuttings and abrasive drilling fluid from passing seal assembly 50 and washing out the lubricant and damaging the bearing surfaces.

Figure 3:
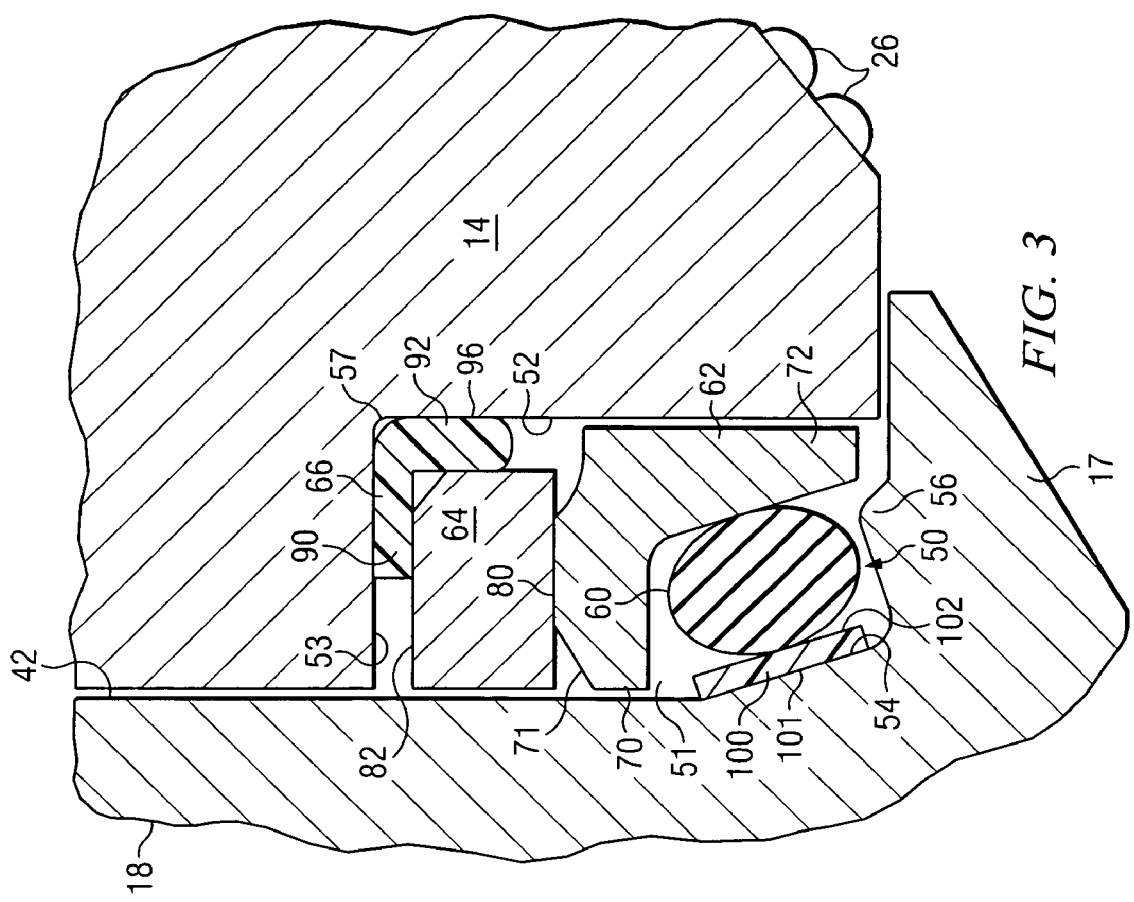
FIG. 3 is an enlarged cross-sectional view of the seal assembly shown in FIG. 2.
Figure 4:
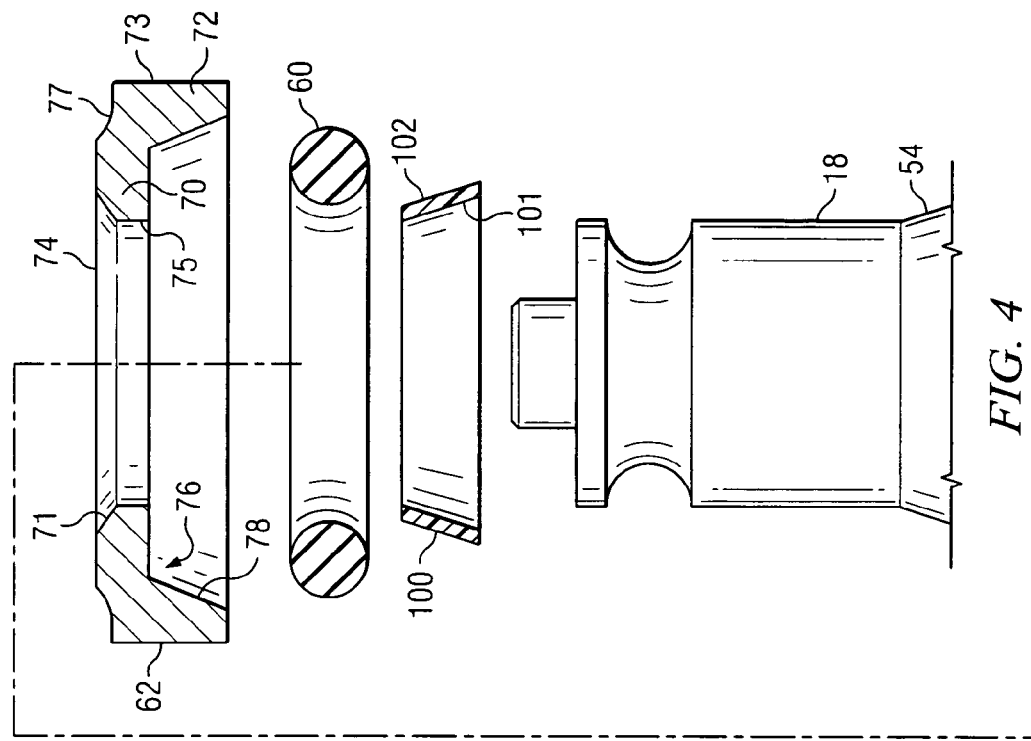
FIG. 4 is an exploded, cross-sectional view, of the seal assembly in FIG. 3, shown prior to assembly.
Figure 4:
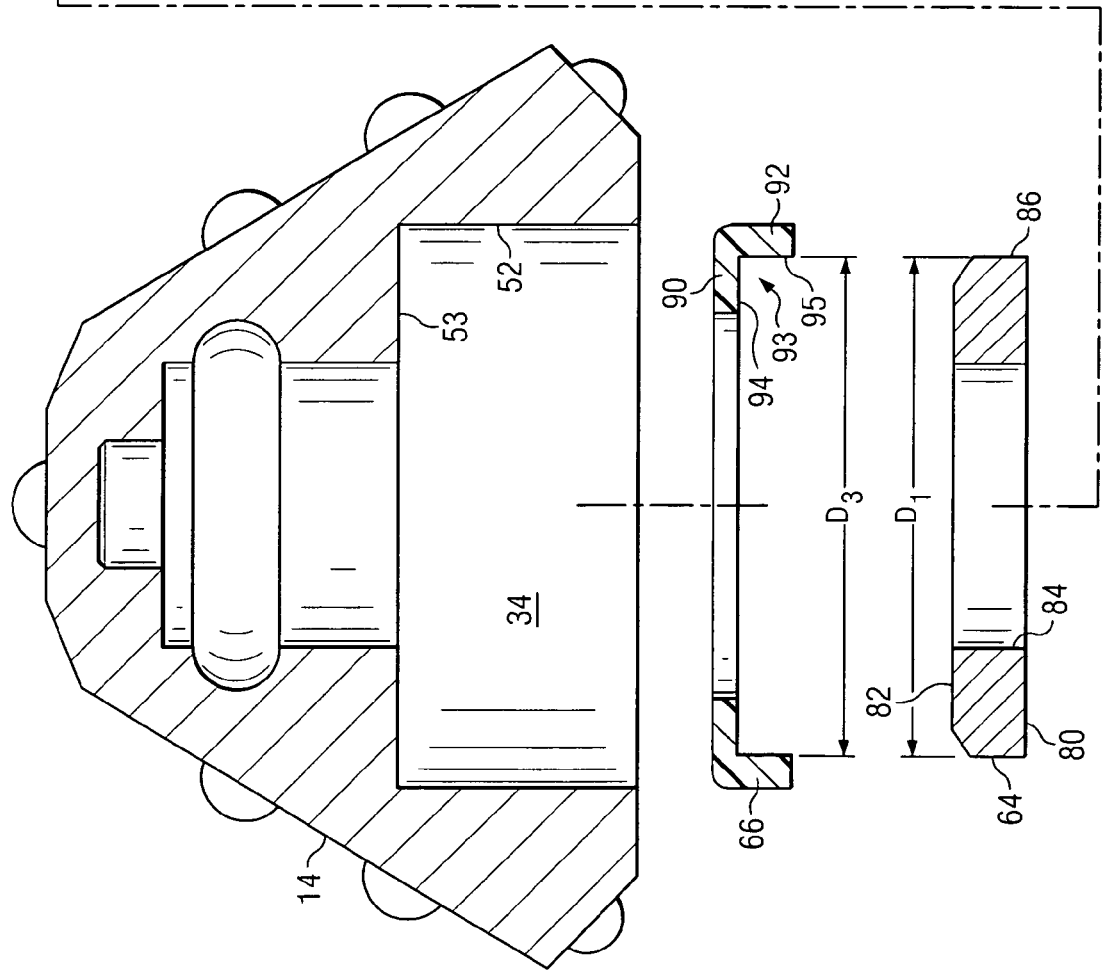

Referring now to FIGS. 3 and 4, seal assembly 50 generally includes energizing ring 60, static seal ring 62, dynamic seal ring 64, and L-shaped resilient ring 66 and energizer pad 100. For convenience, seal ring 62 is referred to as "static" because it is substantially static in relation to bit body 17 and is not intended to rotate about bearing pin 18. Similarly, seal ring 64 is referred to as "dynamic" in this exemplary embodiment as it is intended to rotate relative to static seal ring 62, along with cone 14 and L-shaped ring 66. Seal assembly 50 is retained within a seal gland 51, generally comprising recess 34 in cone 14, recess 34 including shaft-facing cylindrical surface 52 and annular surface 53. As best shown in FIG. 3, seal gland 51 further includes journal pin bearing surface 42 and annular transition surface 54 that extends between bearing surface 42 and bit leg 17. Transition surface 54 further includes an annular extension 56 provided so as to help retain energizer 60 in position.

Energizer 60 is preferably made of an elastomer. In this embodiment, energizer 60 is an O-ring. In its uncompressed and unstretched state prior to assembly, energizer 60 has a generally circular cross-section and an inside diameter slightly larger than the outside diameter of journal pin 18. Energizer 60 may have other cross-sectional shapes, such as oval or rectangular, as examples. It is preferred that energizer 60 be made of a material having a durometer hardness within the range of 55-95A. Suitable elastomeric materials useful for forming energizing ring 60 include those selected from the group of fluoroelastomers including those available under the trade name Advanta manufactured by DuPont, carboxylated elastomers such as carboxylated nitrites, highly saturated nitrile (HSN) elastomers, nitrile-butadiene rubber (HBR), highly saturated nitrile-butadiene rubber (HNBR) and the like. Suitable elastomeric materials have a modulus of elasticity at 100 percent elongation of from about 500 to 2,000 psi (3 to 12 megapascals), a minimum tensile strength of from about 1,000 to 7,000 psi (6 to 42 megapascals), elongation of from 100 to 500 percent, die C tear strength of at least 100 lb/in. (1.8 kilogram/millimeter), durometer hardness Shore A in the range of from about 55 to 95, and a compression set after 70 hours at 100° C. of less than about 16 percent, and preferably less than about 12 percent. A preferred elastomeric material is a proprietary HSN manufactured by Smith International, Inc., under the product name E77.

Static seal ring 62 is generally L-shaped in cross-section, and includes a base portion 70, an axially-extending flange portion 72, and a central aperture slightly larger than the diameter of journal pin 18. Base portion 70 includes generally planar, annular sealing surface 74 for engaging dynamic seal ring 64. The inner surfaces of base portion 70 and axial flange 72 form an energizer-capturing surface 76, including angled surface 78, which is formed at an angle of approximately 20° in relation to journal surface 42. Static seal ring 62 further includes cone facing outer surface 73, pin-facing inner surface 75, and beveled surface 71 between annular sealing surface 74 and inner surface 75. Static seal ring 62 is made of a relatively hard material, such as tungsten carbide, tool steel, or hardened stainless steel. The ring 62 may be made entirely of the same material or, alternatively, the ring may be made of materials having differing hardnesses and durabilities.

Referring still to FIGS. 3 and 4, in this embodiment, dynamic seal ring 64 has a generally rectangular cross-section and a central aperture having a diameter that is slightly larger than the diameter of journal pin 18. Ring 64 includes a generally planar annular dynamic sealing surface 80, and an axially-facing surface 82 opposite from dynamic sealing surface 80. Seal ring 64 further includes a shaft-facing inner surface 84 and a cone facing outer surface 86, each being generally cylindrical. Surface 86 forms the radially-outermost surface of ring 64 and defines outer diameter $D_1$ of ring 64. Dynamic seal ring 64 is preferably made of a hard and rigid material, such as the material used to form static seal ring 62.

L-shaped ring 66 includes base portion 90 and axially-extending flange portion 92 such that, in cross-section, it presents a generally L-shaped configuration. As best shown in FIG. 3, flange portion 92 in this embodiment preferably extends along more than 30% of the entire thickness of dynamic seal ring 64 (i.e., from axially-facing surface 82 to sealing surface 80) although the length of the flange portion may vary. The length of base portion 90 may likewise vary; however, it is preferred that base portion 90 not extend to bearing surface 42 and that a gap remain therebetween, as shown in FIG. 3.

Referring still to FIGS. 3 and 4, L-shaped ring 66 includes an inner sealing surface 93 which, in turn, includes axially-facing surface 94 and radially-facing surface 95. Cylindrical surface 95 defines an inner diameter $D_3$ as measured in an uncompressed, unstretched state prior to assembly. For purposes described below, L-shaped ring 66 is sized such that $D_3$ is less than diameter $D_1$ of seal ring 64.

L-shaped ring 66 further includes outer sealing surface 96, and is preferably made of an elastomeric material.

Suitable elastomeric materials include those selected from the group of fluoroelastomers including those available under the trade name Advanta manufactured by DuPont, carboxylated elastomers such as carboxylated nitrites, highly saturated nitrile (HSN) elastomers, nitrile-butadiene rubber (HBR), highly saturated nitrile-butadiene rubber (HNBR) and the like. Suitable elastomeric materials have a modulus of elasticity at 100 percent elongation of from about 500 to 2,000 psi (3 to 12 megapascals), a minimum tensile strength of from about 1,000 to 7,000 psi (6 to 42 megapascals), elongation of from 100 to 500 percent, die C tear strength of at least 100 lb/in. (1.8 kilogram/millimeter), durometer hardness Shore A in the range of from about 55 to 95, and a compression set after 70 hours at 100° C. of less than about 16 percent, and preferably less than about 12 percent. A preferred elastomeric material is HSN-80A. It is preferred that the material of ring 66 be harder than the material used for energizer 60. As an example, L-shaped ring 60 may be made of an elastomer having a durometer hardness of between approximately 60 and 90A. A durometer hardness of 80A is presently preferred.

Referring still to FIGS. 3 and 4, in accordance with one embodiment of a multi-part energizer, seal assembly 50 includes an annular energizer pad 100 disposed between energizing ring 60 and the journal pin 18. Pad 100 includes a pin-engaging surface 101 and energizer-engaging surface 102 (also referred to herein as radially inner surface 101 and radially outer surface 102). Although annular pad 100 may take various forms, in the embodiment shown in FIGS. 3 and 4, in its uncompressed and unstretched state, prior to assembly on journal pin 18, surfaces 101 and 102 may be described as generally frustoconical. In this manner, radially inner and outer surfaces 101 and 102, respectively, may generally be said to be substantially planar when viewed in cross-section. Preferably, the inside diameter of energizer pad 100 in its uncompressed and unstretched state, is slightly less than the outside diameter of the journal pin segment upon which it engages. Upon assembly, annular energizer pad 100 is stretched to fit about and securely engage journal pin 18. In the embodiment shown in FIGS. 3 and 4, annular energizer pad 100 engages transition surface 54.

Annular energizer pad 100 is preferably made of an elastomeric material, and a material having a relatively high durometer hardness as compared to the material of energizing ring 60. For example, in the embodiment shown in FIGS. 3 and 4, it is preferred that energizer pad 100 have a durometer hardness within the range of 60-110A, and more preferably, about 90A. Also in this embodiment, it is preferred that the hardness of energizer pad 100 be at least 10% higher than the durometer hardness of energizing ring 60. Suitable elastomeric materials for energizer pad 100 include those selected from the group of fluoroelastomers including those available under the trade name Advanta manufactured by DuPont, carboxylated elastomers such as carboxylated nitrites, highly saturated nitrile (HSN) elastomers, nitrile-butadiene rubber (HBR), highly saturated nitrile-butadiene rubber (HNBR) and the like. Suitable elastomeric materials have a modulus of elasticity at 100 percent elongation of from about 500 to 2,000 psi (3 to 12 megapascals), a minimum tensile strength of from about 1,000 to 7,000 psi (6 to 42 megapascals), elongation of from 100 to 500 percent, die C tear strength of at least 100 lb/in. (1.8 kilogram/millimeter), durometer hardness Shore A in the range of from about 55 to 95, and a compression set after 70 hours at 100° C. of less than about 16 percent, and preferably less than about 12 percent. A preferred elastomeric material for energizer pad 100 is ETX.

Upon assembly of bit 10, energizer pad 100 is disposed about journal pin 18 and positioned at transition surface 54. Energizing ring 60 and static seal ring 62 are likewise disposed about journal pin 18. Static sealing ring 62 is pressed against energizer 60 such that energizer 60 is received and retained within capturing surface 76. In turn, energizing ring 60 is pressed against energizer pad 100.

L-shaped ring 66 has an outer diameter slightly larger than the diameter of seal gland 51 as defined by cylindrical surface 52, and ring 66 is disposed in gland 51. As previously described, the outside diameter $D_1$ of dynamic seal ring 64 is greater than the inside diameter $D_3$ of L-shaped ring 66 as measured at radially-facing surface 95. In this manner, upon assembly of bit 10, dynamic seal ring 64 is disposed within the recess of L-shaped ring 66 as formed by base portion 90 and flange portion 92. Because of its larger diameter, ring 64 squeezes the axially-extending flange 92 of L-shaped ring 66. The reactive forces in ring 66 hold dynamic seal ring 64 in position as the cone cutter 14 is disposed about journal pin 18. When cone 14, with L-shaped ring 66 and dynamic seal ring 64 thus retained therein, is pressed on journal pin 18, dynamic seal ring 64 engages static seal ring 62 which, in turn, squeezes energizing ring 60 and energizer pad 100.

The resulting deformation to energizing ring 60 and energizer pad 100 energize the seal assembly, meaning that they tend to bias static seal ring 62 firmly toward dynamic seal ring 64 so that good sealing contact is made between dynamic sealing surfaces 74 and 80. Energizing ring 60 and energizer pad 100 may thus sometimes be referred to collectively as an "energizer." As used herein, the term "energizer" means a resilient component or a combination of components that do not themselves provide a dynamic seal, but instead bias together other seal components that engage one another and provide the dynamic sealing surfaces. Although the "energizer" described herein provides a static seal, it does not provide a dynamic seal and thus is distinguished from conventional O-ring seals that, in prior applications, provided a static seal on one side of the O-ring, and a dynamic seal on the opposite side.

The combination of energizing ring 60 and energizer pad 100 may likewise be referred to herein as a "composite energizer" given that the two components cooperate to provide the desired energizing force to the seal components that provide the dynamic seal. A combination of energizing ring 60 and energizer pad 100 is appropriately referred to as a "composite energizer" without regard to whether energizer 60 and energizer pad 100 are separate components or, as described in later embodiments, are bonded together or otherwise suitably attached to form a single seal component.

As previously described, the L-shaped ring 66 of this embodiment preferably is resilient such that base portion 90 provides auxiliary or additional energization tending to bias dynamic seal ring 64 into sealing engagement with static seal ring 62. Additionally, the relatively high coefficient of friction existing between cone 14 and L-shaped ring 66, and between L-shaped ring 66 and dynamic seal ring 64, helps to keep seal ring 64 stationary with respect to cone 14 as is required for there being a good dynamic seal between rings 64 and 62. Likewise, the relatively high coefficient of friction between bit leg 17 and energizer pad 100, and between energizer pad 100 and energizing ring 60, help to ensure that energizer ring 60 does not rotate, but instead remains stationary with respect to journal pin 18. In this arrangement, static seal surface is formed between the engaging surfaces of energizer pad 100 and energizing ring 60. Likewise, static seal is formed between energizing ring 60 and surface 76 of static seal ring 62. A static seal is also formed between surface 101 of seal pad 100 and journal pin 18.

To provide a good and long-lasting seal, it is important that energizing ring 60 and static seal ring 62 remain stationary with respect to journal pin 18 and bit leg 17. At the same time, energizing ring 60 must provide sufficient force to bias static seal ring 62 axially into good sealing engagement with dynamic sealing ring 64. The properties of an energizing ring 60 providing such force may be such that the ring has a low coefficient of friction and does not provide adequate resistance to prevent energizing ring 60 from rotating about journal pin 18. For example, to provide adequate biasing force, an energizer may be required to have a substantial durometer hardness. However, at the same time, a ring having such hardness may not deform to a significant degree and, therefore, not present a substantial footprint against journal pin 18 and bit leg 17. With a relatively small footprint, there may not be the required contact pressure imposed by the energizing ring 60 onto journal pin 18 to resist rotation.

However, in the arrangement described with respect to FIGS. 3 and 4, energizer pad 100 presents a relatively soft and deformable structure that will provide a substantial footprint against journal pin 18 to resist rotation. Likewise, there will be a relatively high coefficient of friction between annular pad 100 and energizing ring 60 such that both will remain static with respect to journal pin 18. In this arrangement, energizing ring 60 provides most of the force required to bias static seal ring 62 firmly into sealing engagement with dynamic sealing ring 64. At the same time, the relatively soft energizer pad 100 provides a higher coefficient of friction and a larger contact footprint against journal pin 18 than would be provided solely by energizing ring 60.

In the embodiment shown in FIGS. 3 and 4, no roughening or other surface treatment is required to be performed on journal pin 18 or bit leg 17 to create a relatively high friction, rotation-resisting surface to prevent energizing ring 60 from rotating. Thus, such manufacturing procedures are unnecessary, and cost is reduced. In comparison to such procedures, the embodiment of FIGS. 3 and 4 requires only that a resilient annular energizer pad 100 be stretched about journal pin 18 prior to assembly of the other seal components. Further, should energizing ring 60 experience some rotation or slippage about pin 18, annular energizer pad 100 does not present a roughened and therefore abrasive surface that could lead to still further deterioration of energizing ring 60 and ultimate seal failure.

Figure 5A:
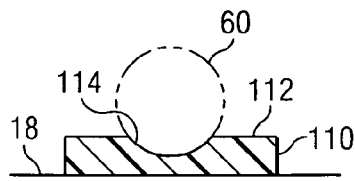
FIGS. 5A-5F are enlarged cross-sectional view of alternative seal assemblies for sealing between the rolling cone cutter and bit body shown in FIG. 2.

Employing annular energizer pad 100 between an energizing ring 60 and journal pin 18 provides additional design opportunities. In particular, the sealing force between annular energizer pad 100, journal pin 18 and energizing ring 60 may be better controlled. In particular, the shape, composition and dimensions of energizer pad 100 may be varied to control the contact pressure exerted between energizer pad 100 and journal pin 18, and between annular pad 100 and energizing ring 60. For example, and referring first to FIG. 5A, there is shown an alternative energizer pad 110 including an energizer-engaging surface 112 formed to include an annular recess 114 that is sized and shaped to conform generally to the curvature of energizing ring 60. In this embodiment, surface 114 provides a larger contact area with energizing ring 60 than would otherwise be presented if energizer pad 100 had a generally planar surface engaging energizing ring 60. The larger surface area contact thus creates greater frictional forces to ensure that energizing ring 60 remains stationary with respect to annular pad 110 and journal pin 18.

Figure 5B:
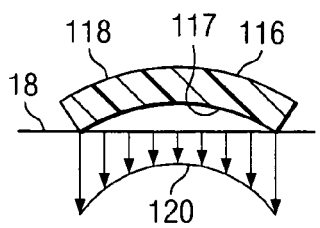
Figure 5C:
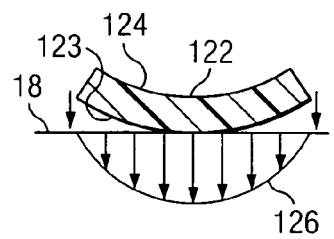

Similarly, referring to FIGS. 5B and 5C, the energizer pad may be formed to have a cross-sectional shape that will provide a non-uniform contact force distribution on journal pin 18 (or other seal component, depending upon its placement in the particular seal design). Referring first to FIG. 5B, an energizer pad 116 is shown to include a radially inner, pin-engaging surface 117 and a radially outer, energizer-engaging surface 118. In this embodiment, in cross-section, surfaces 117 and 118 are curved when pad 116 is in its unstretched and uncompressed state prior to assembly on journal pin 18. Upon assembly, energizer 60 will press against outer surface 118, generally tending to flatten energizer pad 116 against the journal pin 18 so as to present the contact force distribution represented by the graphical representation 120 which shows a higher force at the edges of pad 116 as compared to the middle.

Likewise, referring to FIG. 5C, an energizer ring 122 is shown to have curved inner and outer surfaces 123, 124, respectively, prior to assembly on journal pin 18. Curved outer surface 124 may be selected to approximate the curvature of energizer 60 so as to provide a relatively large contact area as previously described with respect to 5A. Additionally, surface 123 may likewise be curved such that, upon assembly and being pressed against journal pin 18 by energizer 60, energizer pad 100 will present a higher contact pressure adjacent to the center of pad 122, as represented by the graphic force distribution 126.

Figure 5D:
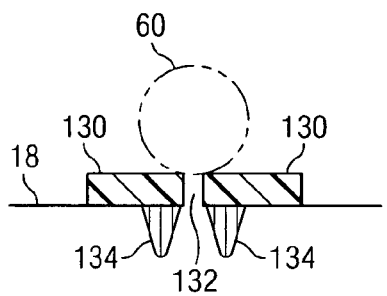

Referring now to FIG. 5D, a still further contact area distribution may be achieved by providing a pair of axially-spaced annular energizer pads 130 that are stretched about journal pin 18 and positioned so as to leave a gap 132 therebetween. In this manner, energizing ring 60 pressed against pads 130 will present the greatest sealing forces against journal pin 18 at locations adjacent to gap 132 as graphically represented by force distributions 134.

Figure 5E:
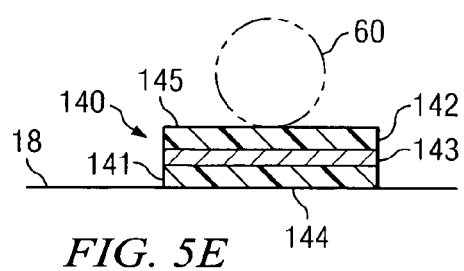

Referring now to FIG. 5E, a further embodiment is shown to comprise energizer pad 140 having inner and outer resilient portions 141 and 142, respectively, bonded to an inner resilient member 143. Portion 141 includes inner surface 144 for engaging journal pin 18, and outer portion 142 includes an outer surface 145 for engaging energizing ring 60. In this embodiment, the material of portion 141 may be optimized to create the optimal footprint and frictional engagement with journal pin 18 needed to prevent relative movement therebetween. Likewise, segment 142 may be made of a different material (or the same material), and a material that is optimized to create the desired frictional force for engaging energizing ring 60 and preventing relative rotation therebetween. Inner portion 143 may be a harder material than materials 141 and 142 so as to provide additional energizing force and increase the strength of energizer pad 140.

It should be understood that the various features described individually with respect to FIGS. 5A-5E may be combined as desired to create an optimum or desired contact force distribution and contact areas. For example, the embodiment shown in 5E may be formed to have an annular depression in outer surface 145 shaped to conform generally to the curvature of energizer ring 60, as previously described with reference to FIG. 5A. Likewise, as a further example, annular energizer pads 130 shown in FIG. 5D may include multiple layers of material so as to provide differing coefficients of friction and contact forces between pads 130 and energizer ring 60, and between pads 130 and journal pin 18.

The embodiments described to this juncture have described the energizer pad as being disposed between energizing ring 60 and journal pin 18. Additionally, similar such energizer pads may be disposed elsewhere in the seal assembly to prevent rotation of an energizing ring relative to another seal component. For example, referring to FIG. 5F, a seal assembly is shown generally including seal pad 100, energizing ring 60, static seal ring 62, dynamic seal ring 64 and O-ring seal 160. In this embodiment, static and dynamic seal rings 62, 64 include sealing surfaces 74, 80, respectively, and energizing ring 60 is provided to bias ring 62 into sealing engagement with ring 64, previously described. The seal assembly of FIG. 5F further includes O-ring seal 160 to seal between cone cutter 14 and dynamic seal ring 64, annular O-ring seal 160 being designed to rotate with cone 14 and dynamic seal ring 64 and thereby remain "static" in relation to those components. As previously described, an annular energizer pad 150 is disposed between seal ring 64 and O-ring seal 160 to provide additional force to ensure that O-ring seal 160 remains stationary with respect to seal ring 64 and rolling cone cutter 14.

Figure 5F:
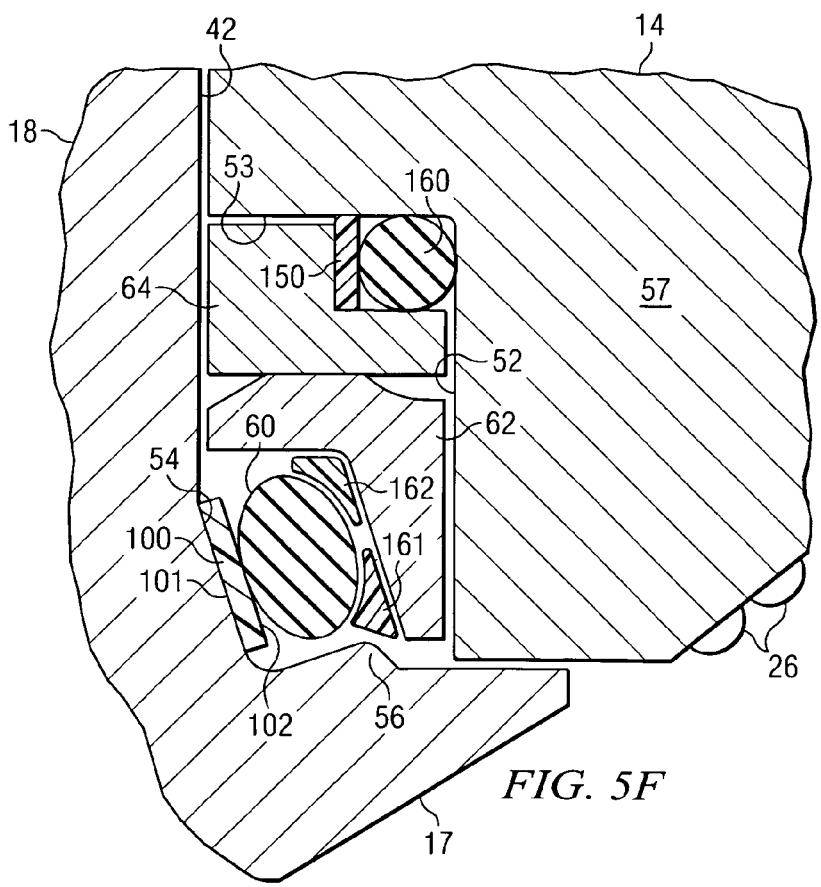

Still referring to FIG. 5F, in this embodiment, annular energizer pads 161, 162 are included and disposed against the energizer capturing surface 76 of static seal ring 62 in spaced-apart relation. Energizer pads 161, 162, in this embodiment, include curved inner surfaces and non-uniform, cross-sectional thicknesses so as to provide the desired contact forces with energizer 60 and static seal ring 62. In this embodiment, annular energizer pads 161, 162 are formed of an elastomeric material so that, upon assembly and energization by energizer ring 60, annular pads 161, 162 will provide substantial footprints against static seal ring 62 to ensure relative rotation will not occur.

The advantages afforded by the annular energizer pads, as described herein, may be achieved regardless of the shape of the metal seal rings. For example, as shown in FIG. 5F, the seal assembly does not include an L-shape ring disposed between dynamic seal ring 64 and cone cutter 14, there instead being a conventional O-ring to seal between ring 64 and cone cutter 14.

Figure 6:
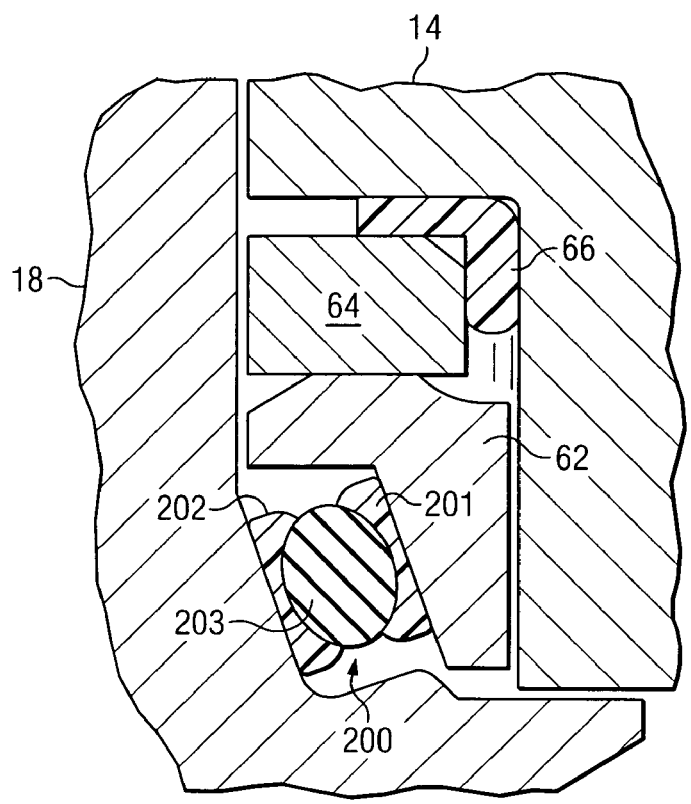
FIG. 6 is an enlarged cross-sectional view of another alternative seal assembly for sealing between the rolling cone cutter and bit body shown in FIG. 2.

Benefits afforded by the annular energizer pads previously disclosed may also be afforded where the energizer pad is bonded to energizing ring 60, as opposed to the energizing ring and energizer pad being separate seal components that engage one another upon bit assembly. For example, referring to FIG. 6, a composite energizer 200 is formed having outer portions 201, 202 of relatively low durometer hardness as compared to the central portion 203. In forming composite energizer 200, the elastomeric materials forming portions 201, 202, 203 are bonded together by conventional cross-linking processes to form energizer 200. Alternatively, portions 201, 202, 203 may be formed separately and adhesively bonded or otherwise suitably secured to one another. With composite energizer 200 formed using any of these methods, the relatively hard inner portion 203 may provide the desired biasing force to ensure that the sealing rings 62, 64 remain in dynamic sealing contact, while the softer portions 201, 202 provide a relatively large footprint and substantial contact pressure against journal pin 18 and static seal ring 62 to prevent relative rotation and provide a static seal.

Figure 7A:
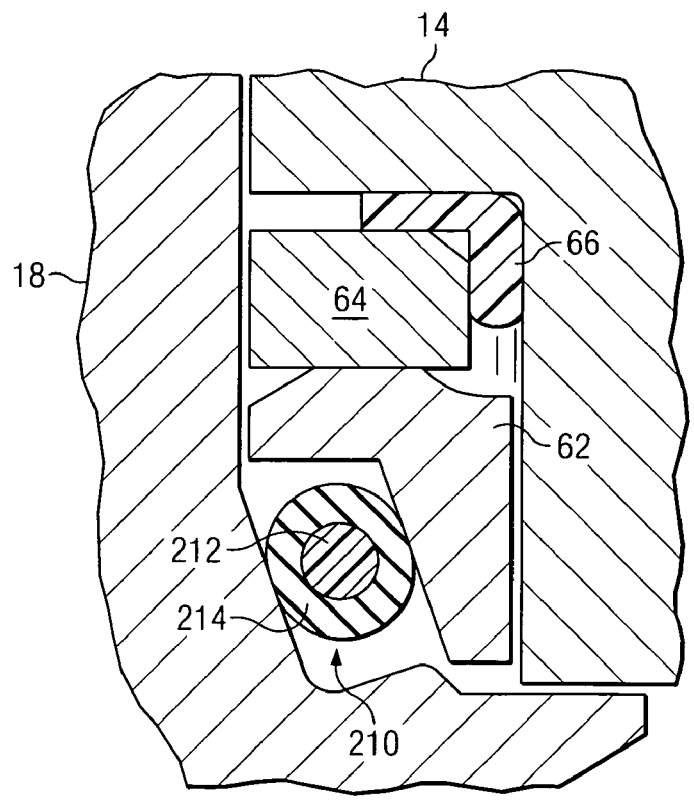
FIGS. 7A-7L are enlarged cross-sectional views of still further alternative seal assemblies for sealing between the rolling cone cutter and bit body shown in FIG. 2.

FIGS. 7A-7L depict alternative embodiments of a composite energizer. As shown in FIG. 7A, energizer 210 includes a relatively hard durometer inner portion 212 that is completely surrounded or enveloped by a softer, low durometer portion 214. Again, the relatively soft outer portion provides high friction, a relatively large footprint, and desired high contact pressure, while the inner portion provides desired energizing force biasing static seal ring 62 into sealing engagement with dynamic seal ring 64.

Depending upon the application, the inner, harder durometer portion of the composite energizer need not be centralized within the softer material as shown in FIG. 7A. Instead, as shown in FIG. 7B, for example, the harder durometer portion 212 of a composite energizer 220 may be positioned off-center relative to the cross-section of the softer material 214, and thus be positioned closer to an adjacent sealing surface, such as the surface of journal pin 18.

Figure 7B:
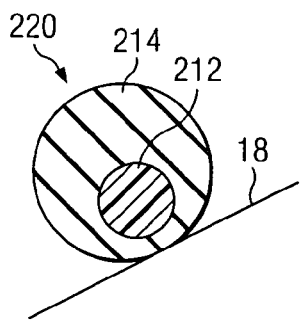
Figure 7C:
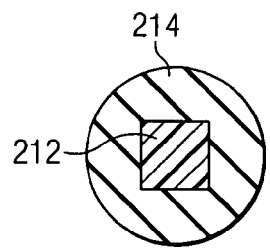
Figure 7D:
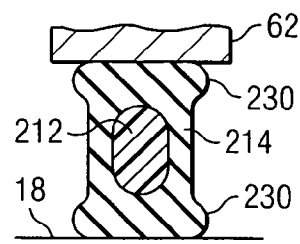
Figure 7E:
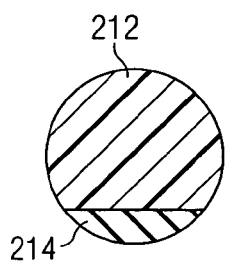
Figure 7F:
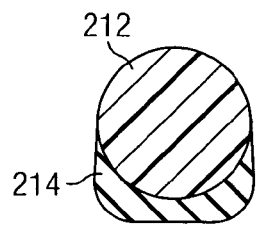
Figure 7G:
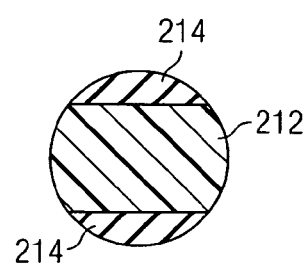
Figure 7H:
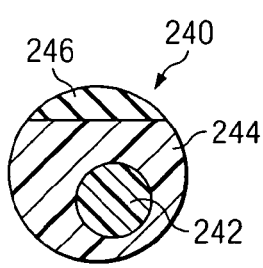
Figure 7I:
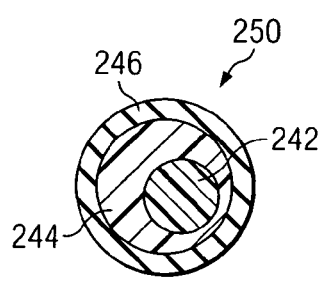
Figure 7J:
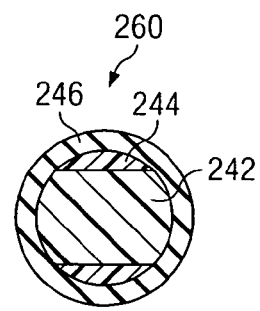

The composite energizer may also include cross-sectional shapes other than circular, as shown in FIG. 7C and FIG. 7D. With respect to the example shown in FIG. 7D, the elongated cross-section of the inner, high durometer portion 212 will provide substantial energizing force. The outer portion of softer material 214 includes flange portions 230 (as viewed in cross-section) so as to increase the footprint and contact force with the engaging surfaces of static seal ring 62 and journal pin 18.

As opposed to the example shown in FIGS. 7B-7D, the relatively soft, lower durometer, outer material 214 may not completely surround the higher durometer internal portions 212, as shown in FIG. 6 and FIGS. 7E-7G. In addition, more than two materials may be used to form a composite energizer. For example, referring to FIGS. 7H-7J, the composite energizers 240, 250, 260 include a relatively hard inner portion 242, softer second portion 244, and a softer still third or outer portion 246. The hard inner portion 242 provides the energizing force required for producing a good seal between dynamic and static seal rings 64, 62. The relatively soft outer portion 246 provides good contact pressure and high friction between the composite energizer and the adjacent seal component surfaces, while the intermediate section 244 optimizes the energizing force and increases the strength of the energizer. The arrangement and use of materials having three or more differing hardnesses may be varied as the design considerations dictate.

Figure 7K:
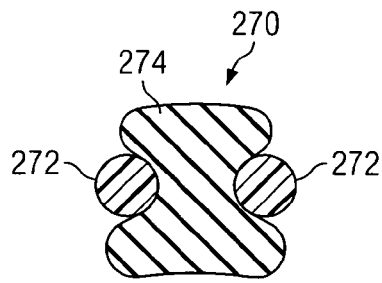
Figure 7L:
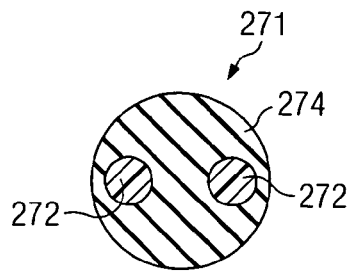

The composite energizers 270, 271 as shown in FIGS. 7K and 7L, respectively, may include multiple portions of relatively hard material 272 for providing the energization necessary for maintaining a dynamic seal between seal rings 62 and 64. These relatively hard sections may be bonded or otherwise joined by softer portion 274 that is of a material having a lower durometer hardness, as desirable for creating high friction, high contact pressures and thereby preventing rotation of the composite ring relative to adjacent stationary seal components. Also, as shown in FIG. 7L, the inner relatively hard segments 272 may be completely retained within the softer material 274.

While various preferred embodiments of the invention have been showed and described, modifications thereof can be made by one skilled in the art. The embodiments herein are exemplary only, and are not limiting. Many variations and modifications of the apparatus and methods disclosed herein are possible and within the scope of the invention. Accordingly, the scope of protection is not limited by the description set out above, but is only limited by the claims which follow, that scope including all equivalents of the subject matter of the claims.

What is claimed is:

1. A seal assembly for a drill bit comprising:
   a bit body including a sealing surface;
   a substantially rigid seal ring having a dynamic sealing surface;
   a first resilient ring having radially inner and radially outer surfaces and comprising a first material;
   a second resilient ring having radially inner and radially outer surfaces and comprising a second material having a different hardness than said first material;
   wherein said radially outer surface of said first resilient ring engages said radially inner surface of said second resilient ring forming a static seal therebetween;
   wherein said radially outer surface of said second resilient ring engages said seal ring and forms a static seal between said seal ring and said second resilient ring; and
   wherein said radially inner surface of said first resilient ring engages said sealing surface of said bit body and forms a static seal between said bit surface and said first resilient ring.

2. The seal assembly of claim 1 wherein the first material is softer than the second material.

3. The seal assembly of claim 1 wherein the first material is harder than the second material.

4. The seal assembly of claim 1, wherein said first material has a hardness within the range of 60-110A and said second material has a hardness within the range of 55-95A.

5. The seal assembly of claim 1 wherein said first and second resilient rings, said seal ring, and said bit surface remain static with respect to one another.

6. The seal assembly of claim 5 wherein said first and second resilient rings are bonded together.

7. The seal assembly of claim 1 wherein said second resilient ring biases said substantially rigid seal ring in a direction away from said bit surface.

8. The seal assembly of claim 7 wherein at least one of said first and second resilient rings includes a surface engaging the other of said rings that is shaped to conform to the cross-sectional shape of said other ring.

9. The seal assembly of claim 7 wherein said first resilient ring comprises two materials having differing durometer hardnesses.

10. The seal assembly of claim 7 wherein said first resilient ring contacts said bit surface in a footprint, said footprint being wider than the cross-sectional width of said second resilient ring.

11. The seal assembly of claim 7 wherein, when viewed in cross-section, at least one of said first and second surfaces of said first resilient ring includes curved portions when said first resilient ring is in an uncompressed and unstretched state prior to assembly.

12. The seal assembly of claim 11 wherein each of said first and second surfaces of said first resilient ring include curved portions when said first resilient ring is in its unstretched and uncompressed state prior to assembly.

13. A seal assembly for a drill bit comprising:
   a substantially rigid seal ring having a dynamic sealing surface;
   a first resilient ring having first and second surfaces and comprising a first material;
   a second resilient ring, having first and second surfaces and comprising a second material having a different hardness than said first material;
   wherein said first surface of said first resilient ring engages said first surface of said second resilient ring forming a static seal between said first surfaces;
   wherein said second surface of said second resilient ring engages said seal ring and forms a static seal between said seal ring and said second resilient ring;
   wherein said second surface of said first resilient ring engages a surface of said bit and forms a static seal between said bit surface and said first resilient ring; and wherein said first material has a hardness within the range of 60-110A and said second material has a hardness within the range of 55-95A.

14. A drill bit comprising:
a bit body having an extending journal shaft and a static sealing surface;
a first substantially rigid seal ring having an annular sealing surface engaging an annular sealing surface of a second substantially rigid seal ring and forming a dynamic seal therebetween;
an energizer biasing said sealing surface of said first substantially rigid seal ring into sealing engagement with said sealing surface of said second substantially rigid seal ring;
said energizer being static with respect to said first seal ring and said static sealing surface of said bit body; and
wherein said energizer comprises:
a first resilient annular member having a radially inner surface engaging said static sealing surface of said bit body and a radially outer surface, said first resilient annular member comprising a first material;
a second resilient annular member having a radially inner surface in engagement with said radially outer surface of said first resilient annular member, said second resilient annular member comprising a second material.

15. The drill bit of claim 14 wherein said second resilient annular member is completely enveloped within said first material.

16. The drill bit of claim 14 wherein said first material, when viewed in cross-section, has a cross-sectional width that is greater than the cross-sectional width of said second material.

17. The drill bit of claim 14 wherein said first material contacts said static seal surface of said bit body and said second material contacts said first seal ring, and wherein said first material has a durometer hardness that is different from the durometer hardness of said second material.

18. The drill bit of claim 14 wherein said first resilient annular member includes an outer surface that is generally frustoconical.

19. The drill bit of claim 14 wherein the first material is softer than the second material.

20. The drill bit of claim 14 wherein the first material is harder than the second material.

21. The drill bit of claim 14 wherein said radially outer surface of said second resilient annular member engages said first seal ring.

22. The drill bit of claim 14 wherein said first resilient annular member is bonded to said second resilient annular member.

23. The drill bit of claim 22 wherein said first resilient annular member comprises at least two different materials having hardnesses less than the hardness of said second resilient annular member.

24. The drill bit of claim 22 wherein said energizer comprises at least three annular members bonded together, said three annular member comprising materials having at least two differing durometer hardnesses.

25. The drill bit of claim 24 wherein said three annular members each have a different durometer hardness.

26. The drill bit of claim 14 wherein said first and second resilient annular members are separate components that come into engagement with each other upon assembly of said drill bit.

27. The drill bit of claim 26 wherein said first resilient annular member includes an engaging surface contacting said second resilient annular member, and wherein said engaging surface is shaped generally to conform to the cross-sectional shape of said second resilient annular member.

28. The drill bit of claim 26 wherein said first resilient annular member includes radially inner and outer surfaces, said inner surface engaging said bit body and said outer surface engaging said second resilient annular member, and wherein at least one of said inner and outer surfaces, when said first resilient annular member is viewed in cross-section and in an uncompressed and unstretched prior to assembly in the drill bit, includes a region that is curved.

29. The drill bit of claim 14 wherein said first resilient annular member comprises at least two resilient rings separated by a gap, said second resilient annular member engaging at least a portion of each of said rings.

30. The drill bit of claim 29 wherein said rings include an engaging surface contacting said second resilient annular member, and wherein said engaging surface of at least one of said rings is shaped to conform generally to the cross-sectional shape of said second resilient annular member.

31. The drill bit of claim 14 wherein said energizer further comprises a third resilient annular member comprising a third material, said second material having a durometer hardness greater than the durometer hardness of said third material.

32. The drill bit of claim 31 wherein said third material engages said first substantially rigid seal ring and said first material engages said static surface of said bit body.

33. A drill bit for drilling through earthen formations comprising:
a bit body having an extending journal shaft;
a rolling cone cutter rotatably mounted on said journal shaft;
a seal gland between said rolling cone cutter and said bit body and including a static sealing surface on said bit body;
a seal assembly disposed in said seal gland, said seal assembly comprising:
a first resilient annular member disposed about said journal shaft, wherein said first resilient annular member has a radially inner surface and a radially outer surface, said radially inner surface of said first resilient annular member engaging said static sealing surface of said bit body;
a second resilient annular member disposed about said journal shaft, wherein said second resilient annular member has a radially inner surface and a radially outer surface, said radially inner surface of said second resilient annular member engaging said radially outer surface of said first resilient annular member, said first and second annular members forming an energizer;
a substantially rigid seal ring disposed about said journal shaft and engaging said energizer;
wherein said first and second resilient annular members comprise materials having differing durometer hardnesses.

34. The drill bit of claim 33 wherein said first and second resilient annular members are bonded together forming a ring.

35. The drill bit of claim 33 wherein said first and second resilient annular members are separate elements that are pressed into engagement with one another but are otherwise unattached.

36. The drill bit of claim 33 wherein said first annular member comprises at least a first and second material, wherein at least one of said first and second materials of said first annular member has a durometer hardness that is different from the durometer hardness of said material of said second resilient annular member.

37. The drill bit of claim 33 wherein said first resilient annular member engages said substantially rigid seal ring.

38. The drill bit of claim 33 wherein a portion of said second resilient member engages said substantially rigid seal ring.

39. The drill bit of claim 33 wherein said energizer comprises at least three materials that differ in durometer hardness.

40. The drill bit of claim 33 wherein said first resilient annular member comprises at least two materials that differ in durometer hardness.

41. The drill bit of claim 33 wherein the material of said first resilient annular member is softer than the material of said second resilient annular member.

42. The drill bit of claim 33 wherein the material of said first resilient annular member is harder than the material of said second resilient annular member.

43. The drill bit of claim 33 wherein said first annular member comprises a first material having a first durometer hardness within the range of 60-110A, and said second annular member comprises a second material having a second durometer hardness within the range of 55-95A.

44. The drill bit of claim 33 wherein said seal ring engages said radially outer surface of said second resilient annular member forming a static seal therebetween.

45. The drill bit of claim 33 wherein said first resilient annular member includes a radially inner side and a radially outer side, and wherein at least one of said inner and outer sides is non-planar when said first resilient annular member is viewed in cross-section.

46. The drill bit of claim 45 wherein said radially outer side includes a region shaped to conform to the cross-sectional shape of said second resilient annular member.

47. A drill bit for drilling through earthen foundations comprising:

a bit body having an extending journal shaft;

a rolling cone cutter rotatably mounted on said journal shaft;

a seal gland between said rolling cone cutter and said bit body and including a static sealing surface on said bit body;

a seal assembly disposed in seal gland, said seal assembly comprising:

a first resilient annular member disposed about said journal shaft and engaging said static sealing surface of said bit body;

a second resilient annular member disposed about said journal shaft and engaging said first resilient annular member, said first and second annular members forming an energizer;

a substantially rigid seal ring disposed about said journal shaft and engaging said energizer;

wherein said first annular member comprises a first material having a first durometer hardness within the range of 60-110A, and said second annular member comprises a second material having a second durometer hardness within the range of 55-95A.

* * * * *